United States Patent
Jain et al.

(10) Patent No.: US 9,841,910 B2
(45) Date of Patent: Dec. 12, 2017

(54) MOVING AND COMMITTING VALID DATA ON A SET-BY-SET BASIS

(71) Applicant: SanDisk Technologies Inc., Plano, TX (US)

(72) Inventors: Vimal Kumar Jain, Bangalore (IN); Dinesh Agarwal, Bangalore (IN); Vijay Sivasankaran, Bangalore (IN); Kumar Amarjit, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 210 days.

(21) Appl. No.: 14/700,814

(22) Filed: Apr. 30, 2015

(65) Prior Publication Data

US 2016/0092128 A1 Mar. 31, 2016

(30) Foreign Application Priority Data

Sep. 30, 2014 (IN) .......................... 4929/CHE/2014

(51) Int. Cl.
*G06F 12/00* (2006.01)
*G06F 3/06* (2006.01)
*G06F 11/10* (2006.01)

(52) U.S. Cl.
CPC .......... *G06F 3/0619* (2013.01); *G06F 3/0647* (2013.01); *G06F 3/0688* (2013.01); *G06F 11/10* (2013.01)

(58) Field of Classification Search
CPC .... G06F 3/0619; G06F 3/0647; G06F 3/0688; G06F 12/0238; G06F 11/10

USPC ...... 711/103, 151, 156, 165; 710/16, 19, 53, 710/55, 120; 713/161, 502, 600; 714/33, 714/52, 743; 365/186, 187, 189.17, 208, 365/233.9

See application file for complete search history.

(56) References Cited

U.S. PATENT DOCUMENTS

| 5,930,167 | A | * | 7/1999 | Lee | ..................... | G06F 12/0246 365/185.03 |
|---|---|---|---|---|---|---|
| 6,456,528 | B1 | * | 9/2002 | Chen | ....................... | G11C 11/56 365/185.03 |
| 7,009,889 | B2 | * | 3/2006 | Tran | .................... | G11C 16/3468 365/185.17 |
| 8,145,855 | B2 | | 3/2012 | Wan et al. | | |
| 8,301,912 | B2 | | 10/2012 | Lin et al. | | |
| 8,429,330 | B2 | | 4/2013 | Wan et al. | | |
| 8,953,398 | B2 | * | 2/2015 | Lee | ......... | G11C 29/82 365/185.11 |
| 2012/0297111 | A1 | | 11/2012 | Hsu et al. | | |
| 2013/0031430 | A1 | * | 1/2013 | Sharon | ................ | G11C 11/5642 714/719 |
| 2015/0348649 | A1 | * | 12/2015 | Yang | ...................... | G11C 29/44 714/723 |
| 2016/0019111 | A1 | * | 1/2016 | Kochar | ............... | G06F 11/1068 714/6.12 |

* cited by examiner

*Primary Examiner* — Reba I Elmore
(74) *Attorney, Agent, or Firm* — Brinks Gilson & Lione

(57) ABSTRACT

A storage module may be configured to organize data to be moved from an initial storage location to a destination storage location into sets, and to determine whether to commit the data to the destination storage location on a set-by-set basis. Error correction and/or a post write and read process may be performed on the sets that are copied to the destination storage location to determine whether to commit each of the copied sets.

22 Claims, 7 Drawing Sheets

MOVING AND COMMITTING VALID DATA ON A SET-BY-SET BASIS

CROSS-REFERENCE TO RELATED APPLICATIONS

This application claims priority to Indian Patent Application No. 4929/CHE/2014, filed Sep. 30, 2014. The contents of Indian Patent Application No. 4929/CHE/2014 are incorporated by reference in their entirety.

BACKGROUND

Storage modules include a memory having different areas with different bits-per-cell densities. The storage module may determine to move data stored in a lower bit-per-cell density area to a higher bit-per-cell density area. If an error event occurs, only some of the data to be moved may be correctly written to the higher bit-per-cell density area. In response to the error event, the data that was written to the higher bit-per-cell density area may be discarded and the entire process may be repeated. However, this way of moving the data when error events occur may decrease performance and in some situations, the higher bit-per-cell density area may be erroneously discarded.

SUMMARY

Embodiments of the present invention are defined by the claims, and nothing in this section should be taken as a limitation on those claims. By way of example, the embodiments described in this document and illustrated in the attached drawings generally relate to a storage module and related methods of a controller that executes context commands on a communications bus in accordance with a cache sequence while a memory module performs internal memory operations.

In one example, a storage module may include at least one memory; and control circuitry in communication with the at least one memory. The control circuitry may be configured to move data stored in a first memory area of the at least one memory to a second memory area of the at least one memory, where the data may be organized into a plurality of sets. The control circuitry may include: a selection and tracking module configured to identify each of the plurality of sets as valid or invalid; a copy module configured to store a copy of a set of the plurality of sets to the second memory area in response to the selection and tracking module identifying the set as valid; and a commit determination module configured to update an address database to identify that a valid version of the set is located at a physical address in the second memory area where the copied set is stored in response to the copied set passing a post-write-read error analysis.

In another example, a method of a storage module moving data may include: with control circuitry of the storage module: determining to move data stored in a first block of memory to a second block of memory; storing a first copy of a first portion of the data without storing a second copy of a second portion of the data; and updating an address database to identify that a valid version of the first portion is stored in the second block when the first copy passes a post-write-read error analysis.

In sum, a storage module may move data from a first block to a second block on a set-by-set basis. An address database may be updated to identify that a valid version of a set is stored in the second block even if not all of the sets stored in the first block are successfully copied to the second block. Accordingly, blocks storing only partially written data may still be used. In addition, a plurality of different scrambling keys may be used to scramble and descramble the data. The order in which the scrambling keys are used may be the same when scrambling each of the sets. Accordingly, even less than all of the sets are copied to the second block, the data in the sets may be correctly descrambled.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

The present description describes a storage module that is configured to organize data to be moved from an initial storage location to a destination storage location into sets, and to determine whether to commit the data to the destination storage location on a set-by-set basis. Error correction and/or a post-write-read error analysis or process may be performed on the sets that are copied to the destination storage location to determine whether to commit each of the copied sets. After committing the copied sets, the storage module may know to access the pages of the copied sets at the destination storage location rather than at the initial storage location or an intermediate storage location. By organizing the data into sets and committing the sets on a set-by-set basis, the destination storage location may be utilized even if only some of the data is correctly copied to the destination storage location.

In addition, a plurality of scrambling keys may be utilized to scramble and descramble the data that is being moved to the destination storage location. Each page in a set may be scrambled by a different one of the plurality of scrambling keys, and the order in which the pages in a set are scrambled by the different scrambling keys may the same for each of the sets. Accordingly, even if only some of the sets of data are correctly copied to the destination storage location, the copied sets may be correctly descrambled with the correct scrambling keys.

Figure 1:
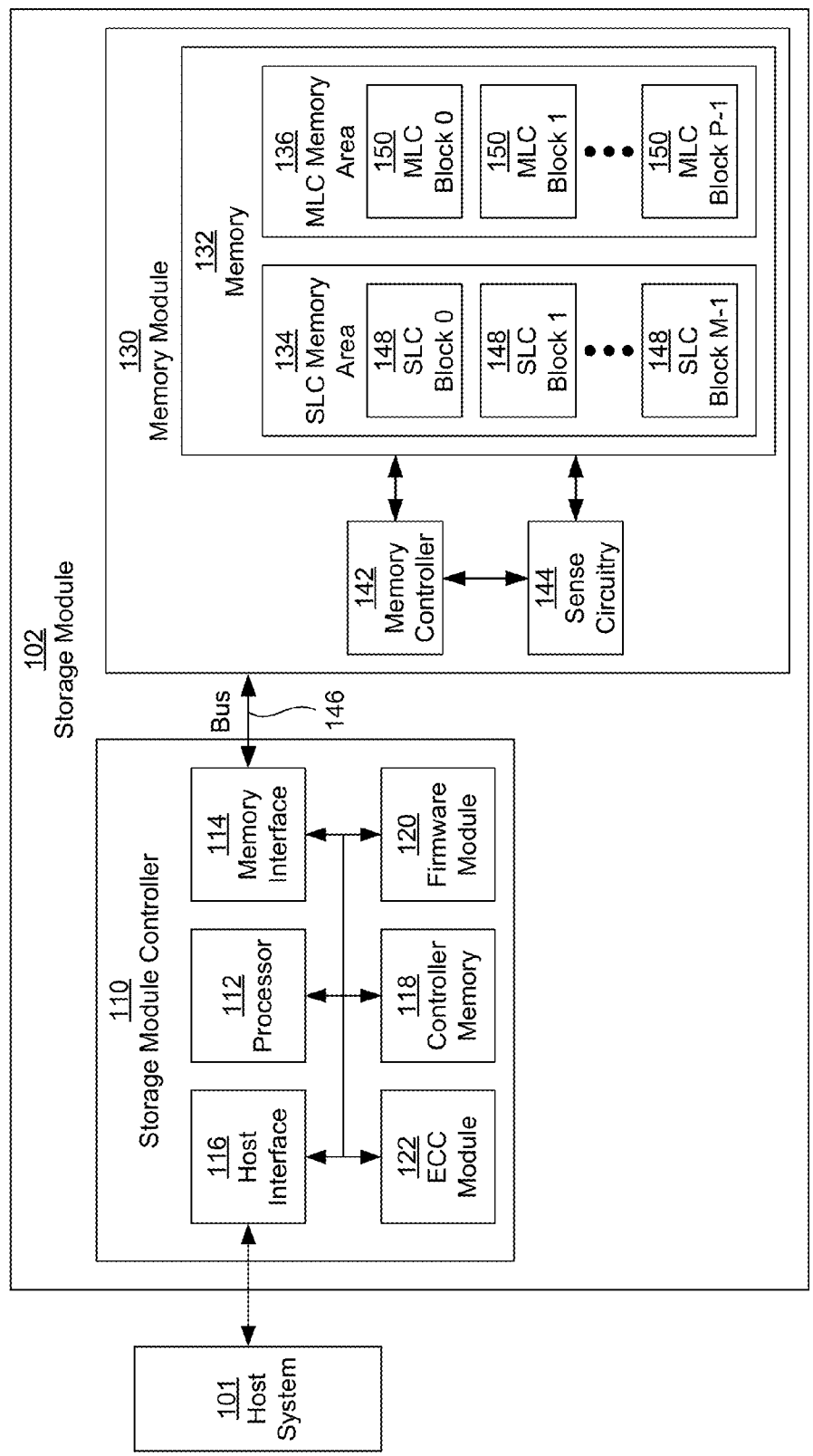
FIG. 1 is a block diagram of an example storage system.

FIG. 1 shows a block diagram of an example system 100 that includes a host system 101 and a storage module 102. The host system 101 may be configured to store data into and retrieve data from the storage module 102. The storage module 102 may be configured to perform memory management functions that control and manage the storage and retrieval of the data. As shown in FIG. 1, the storage module 102 may include a storage module controller or control circuitry 110, a memory module 130, and a communications bus 146. Depending on the configuration of the storage module 102, the storage module controller 110 and the memory module 130 may be on the same or different substrates. The communications bus 146 may provide a communications link between the storage module controller 110 and the memory module 130. The communications bus 146 may be used by the storage module controller 110 and the memory module 130 to communicate data, commands, or other information or messages in order to perform the memory management functions.

The storage module controller 110 may include a processor or processor circuit 112 that is configured to perform and/or control the performance of at least some of the memory management functions. The processor 112 may include a single processor or a plurality of processors configured to perform various types of processing, such as co-processing, multi-processing, multi-tasking, parallel processing, remote processing, distributed processing, or the like, in order to perform the memory management functions. The processor 112 may be a microprocessor, a microcontroller, an application specific integrated circuit (ASIC), a field programmable gate array, a logic circuit (including an analog or digital logic circuit or combinations thereof), other now known or later developed circuitry having logical processing capability, or combinations thereof. In addition or alternatively, the processor may be configured to execute program instructions that may be part of software, microcode, firmware, stored in hardware, or the like in order to perform at least some of the memory management functions.

In addition, the storage module controller 110 may also include a memory interface 114 that interfaces with the memory module 130. The storage module controller 110 may also include a host interface 116 that configures the storage module 102 operatively in communication with the host system 101. As used herein, the phrase "operatively in communication with" could mean directly in communication with or indirectly in communication with through one or more components, which may or may not be shown or described herein. The processor 112, through or using the host interface 116, may receive host requests, such as host read and write requests, from the host system 101, and send, through or using the host interface 116, responses to the host read and write requests to the host system 101. Additionally, the host interface 116 may take any suitable form, such as, but not limited to, an eMMC host interface, a UFS interface, and a USB interface, as examples.

Also, some configurations of the storage module controller 110 may include controller memory 118, which may be separate or "off-chip" from memory 132 in the memory module 130, and which may include one or more various types of memory structures or technologies of volatile memory, non-volatile memory, or combinations thereof. The processor 112 may use or access the controller memory 118 to perform its associated memory management functions. For example, software and/or firmware including program instructions may be stored in the controller memory 118, which the processor 112 may execute to perform one or more memory management functions. In addition or alternatively, data may be temporarily stored in the controller memory 118 before being stored in the memory module 130 or sent to the host system 101.

The storage module controller 110 may also include a firmware module 120. The firmware module 120 may include software and/or a set of executable program instructions, which may be stored in the controller memory 118 and/or which the processor 112 may execute or use to perform one or more of the memory management functions.

In addition, the storage module controller 110 may include an error correction code (ECC) module or engine 122 that that may be configured to compensate for bits that may spontaneously fail during normal device operation to ensure data integrity. The ECC module 122 may include or be configured to operate in accordance with one or more algorithms. In addition, the ECC module 122 may be implemented in hardware, software, or a combination thereof. For example, the ECC module 122 may be implemented in hardware logic and/or have its own built-in processor dedicated to performing ECC functions. In addition or alternatively, the ECC module 122 may include software, which may be stored in the controller memory 118 and/or which the processor 122 may execute or use to perform all or some of the ECC functions. As described in further detail below, the ECC module 122 may be used in conjunction with a post-write-read error analysis, such as an enhanced post-write-read (EPWR) error analysis, in order to ensure user data integrity and to increase memory reliability after memory is programmed or copied from a source to a destination.

The memory module 130 may include memory 132 configured to store data or other information in the storage module 102. In addition, the memory module 130 may include a memory controller or memory control circuitry 142 configured to control and/or manage the storage of data in the memory 132. The memory controller 142 may be configured to perform various memory management functions to control and/or manage the data storage, including, but not limited to, addressing, data transfer, sensing, row and column decoding, and/or gate biasing. In addition, the memory controller 142 may provide an interface between the storage module controller 110 and the memory 132, such that the memory controller 142 may control and/or manage the storage of data in the memory 132 in response and/or according to context instructions or commands, such as sense, program, and/or erase commands, received from and/or generated by the storage module controller 110. Additionally, the memory controller 142 may be implemented in hardware or a combination of hardware and software, and include one or more processors, logic circuits, buffers, voltage generators, and/or other circuitry to perform the functions of the memory controller 142.

The memory module 130 may further include sense circuitry 144, which may include sense amplifiers configured to sense data stored in the memory 132 and latches or page buffers configured to store the sensed data. Sensed data may then be transferred to the storage module controller 110, such as to a RAM portion of the controller memory 118 via the communications bus 146.

Further, FIG. 1 shows the storage module controller 110 and the memory controller 142 as separate components of the storage module 102. The storage module controller 110 may be "off chip" from the memory 132, whereas the memory controller 142 may be "on chip" with the memory 132. However, for other example configurations, the memory controller 142 and/or the functions performed by the memory controller 142 may be incorporated into the storage module controller 110, and the storage module controller 110 may be configured to communicate directly with the memory 132 and/or the sense circuitry 144. Such other example configurations may be implemented where the storage module controller 110 and the memory module 130 are part of the same substrate.

The memory 132 may include volatile memory, non-volatile memory, or combinations thereof. In addition or alternatively, the memory 132 may include a single type of memory (such as a single type of volatile memory or a single type of non-volatile memory) or different types of memory (such as different types of volatile memory, different types of non-volatile memory, or combinations thereof). An example type non-volatile memory may be flash memory, such as NAND flash memory, although other types of memory, including non-volatile and/or volatile memory types, may be possible.

In addition, the memory 132 may be a single physical space (such as a single die or a single chip) in which the storage module controller 110 may use the same channel of the communications bus 146 to access the single physical space. Alternatively, the memory 132 may include multiple, different physical spaces (such as multiple dies or multiple chips) in which the storage module controller 110 may use different channels of the communications bus 146 to access the different physical spaces.

In addition, the memory 132 may include a plurality of memory elements or cells, each configured to store one or more bits of data. In particular, the memory elements may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Whether a memory element is a SLC or a MLC may depend on the number of bits programmed or written into the memory element and/or the number of bits the memory element is storing. For example, if a memory element is storing a single bit of data, then the memory element may be configured as a SLC. Alternatively, if a memory element is storing multiple (two or more) bits of data, then the memory element may be configured as a MLC. Accordingly, each of the memory elements may be configured or programmed in a SLC mode or a MLC mode, as determined by how many bits each of the memory elements is storing. Further, for some example configurations, the mode in which each of the memory elements is configured may be dynamic. For example, a memory element may be programmed as a SLC and subsequently programmed as a MLC, or vice versa. For other example configurations, the modes may be static, in that a mode in which a memory element is configured or programmed may not change.

As shown in FIG. 1, the memory 132 may be separated or into a SLC memory area 134 and a MLC memory area 136. The memory elements in the SLC memory area 134 may be configured as SLC memory elements, and the memory elements in the MLC memory area 136 may be configured as MLC memory elements. The SLC memory area 134 and the MLC memory area 136 may be part of the same physical space or located on different physical spaces.

In addition, the memory 132 may have an organizational arrangement or hierarchy under which the memory elements or cells of the memory 132 may be organized. The storage module controller 110 may be configured to store data and/or access stored data in accordance with the organizational arrangement or hierarchy.

For some example configurations of flash memory, the memory elements may be divided or organized into blocks, with each block containing the minimum number of memory elements that may be erased together. Each block may be further divided into a number of pages, with each page being a unit of programming or reading. Each individual page may further be divided into segments or fragments, with each segment or fragment containing the fewest number of memory elements that may be written at one time as a basic programming operation.

Data may be stored in the flash memory as one or more blocks of data or as one or more pages of data. Accordingly, a block or a page of SLCs may store a single block of data or a single page of data, respectively. A block or a page of MLCs may store two or more blocks of data or two or more pages of data, respectively, depending on how many bits each of the MLCs store.

Additionally, for some example configurations, multiple blocks and pages may be distributed across multiple arrays and operated together as metablocks and metapages, respectively. Alternatively, the distribution of blocks and pages may be confined to a single array. Data may be stored in a block and/or a metablock in various ways, including non-contiguously (randomly) or contiguously. As used herein, and unless otherwise specified, the terms "block" and "metablock" and the terms "page" and "metapage" may be used interchangeably and/or referred to collectively as "metablock" and "metapage" respectively, without concern for whether the block/metablock and page/metapage span a single array or multiple arrays.

For example configurations where the memory 132 comprises flash memory, each memory element may be a floating gate transistor (FGT) that has a floating gate and a control gate. The floating gate may be surrounded by an insulator or insulating material that helps retain charge in the floating gate. The presence or absence of charges inside the floating gate may cause a shift in a threshold voltage of the FGT, which may be used to distinguish logic levels. That is, each FGT's threshold voltage may be indicative of the data stored in the memory cell. Hereafter, FGT, memory element or memory cell may refer to the same physical entity and/or may be used interchangeably.

The memory cells may be disposed in the NAND-type flash memory array 132 in accordance with a matrix-like structure of rows and columns of memory cells. At the intersection of a row and a column may be a FGT (or memory cell). A column of FGTs may be referred to as a string. FGTs in a string or column may be electrically connected in series. A row of FGTs may be referred to as a page. Control gates of FGTs in a page or row may be electrically connected together.

The memory 132 may also include wordlines and bitlines connected to the FGTs. Each page of FGTs may be coupled to a corresponding wordline. In particular, each wordline may be coupled to the control gates of FGTs in a page. In addition, each string of FGTs may be coupled to a corresponding bitline. That is, each bitline may be coupled to a string of FGTs. Further, multiple wordlines may span across a single string, and the number of FGTs in a string may be equal to the number of pages in a block.

Figure 2:
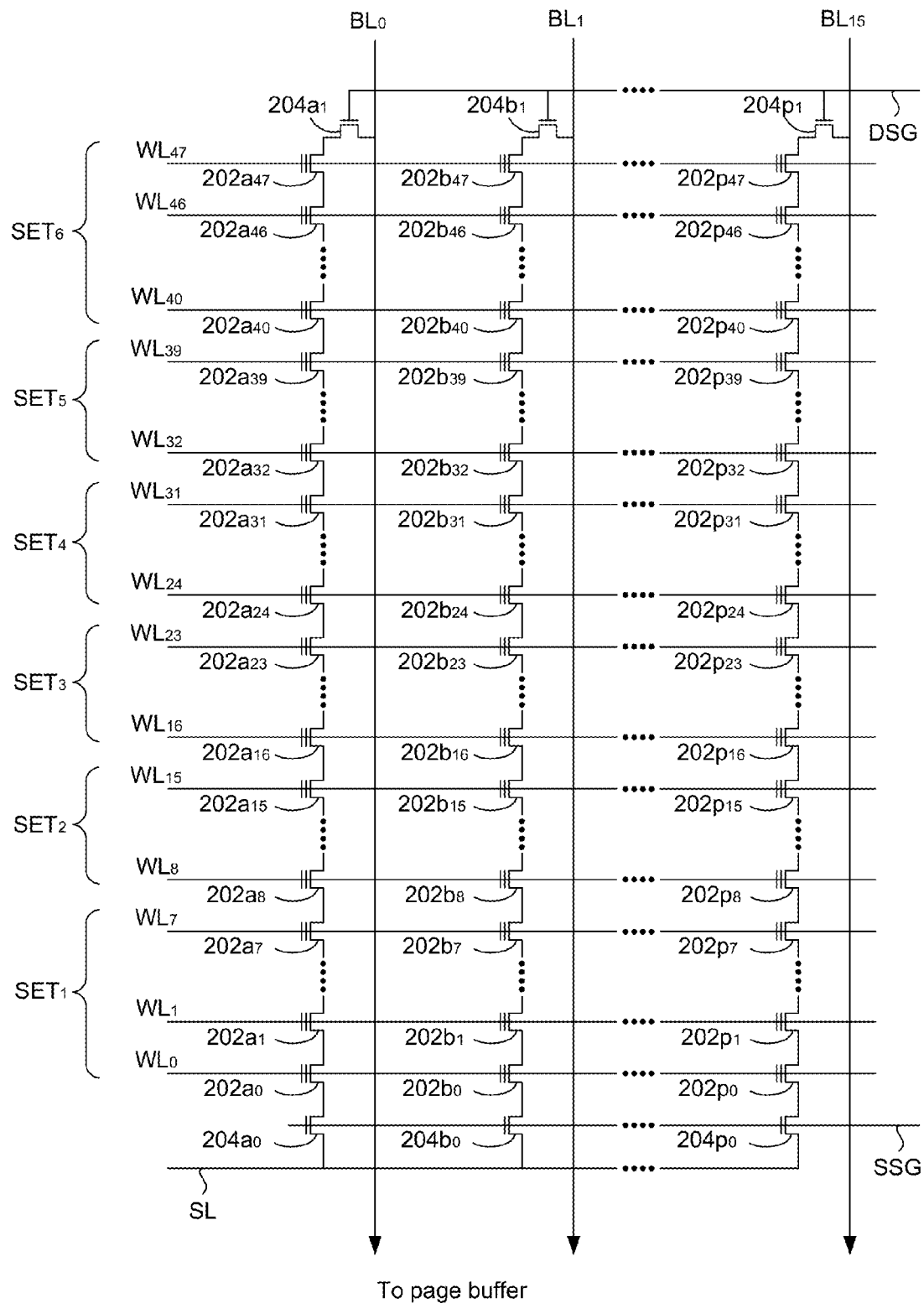
FIG. 2 is a circuit schematic diagram of a portion of a memory block.

FIG. 2 shows a circuit schematic diagram of a portion of a NAND-type flash memory 132. The portion shown in FIG. 2 includes shows a plurality of strings of forty-eight FGTs connected in series, including a first string of FGTs $202a_0$ to $202a_{47}$ and a second string of FGTs $202b_0$ to $202b_{47}$ extending to a sixteenth string of FGTs $202_{p0}$ to $202_{p47}$. A complete block may include many more strings than sixteen. In addition, numbers other than forty-eight FGTs per string and/or forty-eight wordlines may alternatively be used.

For the portion shown in FIG. 2, the first string is coupled to a first bitline $BL_0$. The second string is coupled to a second bitline $BL_1$, and the sixteenth string is coupled to a sixteenth bitline $BL_{15}$. Additionally, the portion shown in FIG. 2 includes forty-eight wordlines $WL_0$ to $WL_{47}$ coupled to forty-eight pages of FGTs—wordline $WL_0$ is coupled to control gates of FGTs in a first page comprising FGT $202a_0$, $202b_0, \ldots, 202p_0$; wordline $WL_1$ is coupled to control gates of FGTs in a second page comprising FGT $202a_1$, $202b_1, \ldots, 202p_1$; and so on.

To perform a read operation, a page of FGTs and a corresponding wordline may be selected, and current sensing of bitlines may be employed to determine whether a floating gate of a FGT in the selected page contains charge or not. Current flowing through a string may flow from a source line SL, through the string, to the bitline BL to which the string is coupled. The string may be coupled to the source line SL via a source select transistor and may be coupled to its associated bitline BL via a drain select transistor. For example, as shown in FIG. 2, the first string of FGTs $202a_0$ to $202a_{63}$ may be coupled to the source line SL via a source select transistor $204_4$ that is connected to the source line SL and a first end FGT $202_4$ of the first string. The other strings may be similarly coupled. Further, switching of the source select transistors $204a_0, 204b_0, \ldots, 204p_0$ may be controlled using a source select gate bias line SSG that supplies a source select gate bias voltage $V_{SSG}$ to turn on an off the source select transistors $204a_0, 204b_0, \ldots, 204p_0$. Additionally, switching of the drain select transistors $204a_1, 204b_1, \ldots, 204p_1$ may be controlled using a drain select gate bias line DSG that supplies a drain select gate bias voltage $V_{DSG}$ to turn on and off the drain select transistors $204a_1, 204b_1, \ldots, 204p_1$.

Referring back to FIG. 1, the SLC memory area 134 may include SLC memory elements arranged into an M-number of SLC blocks 0 to (M−1), where M is one or greater. Similarly, the SLC memory area 136 may include a P-number of MLC blocks 0 to (P−1), where P is one or greater.

For some situations, data stored in one or more of the SLC blocks 148 may be moved or copied to one or more of the MLC blocks 150. As an example, where an MLC block 150 stores three bits per cell, data stored in three SLC blocks 148 may be copied to a single MLC block 150, where the data is stored in upper, middle, and lower pages of the MLC block 150. The moving or copying of data from the SLC memory area 134 to the MLC memory area 136 (or from one or more SLC blocks 148 to one or more MLC blocks 150) may be referred to as a folding operation. During a folding operation, the SLC blocks 148 storing the data to be copied may be referred to as source blocks or source SLC blocks, and the MLC blocks 150 into which the data may be copied may be referred to as destination blocks or destination MLC blocks.

For some situations, a folding operation may be performed as a second step to programming data into an MLC block 150. That is, while programming data directly from a RAM portion of the controller memory 118 to a MLC block 150 may be performed, such direct programming may be time consuming, take up a lot of space in the RAM portion of the controller memory 118, or otherwise be relatively inefficient. Rather than directly programming the data into the MLC memory area 136, the data may first be programmed from the RAM portion of the controller memory 118 to the SLC memory area 134. Subsequently, the data stored in the SLC memory area 134 may be moved or copied to the MLC memory area 134.

While movement or copying of the data from the controller 118 to the SLC memory area 134 may involve the storage module controller 110, movement or copying of the data from the SLC memory area 134 to the MLC memory area 136 may be an operation that is internal or local to the memory module 130 and without involvement by the storage module controller 110. In particular, after the data is stored in the SLC memory area 134, the memory controller 142 and the sense circuitry 144 may operate to sense the stored data into page buffers of the sense circuitry 144. Thereafter, the sensed data may be directly transferred to an MLC block 150 of the MLC memory area 136, rather than first transferred to the controller memory 118 and then to an MLC block 150 of the MLC memory area.

During a folding operation where data stored in one or more source SLC blocks 148 is to be copied to a destination MLC block 150, an error event may occur that result in only some of the data being successfully written to the destination MLC block 150. An example error event may include a power cycle (shutdown) or write abort event, which may cause the copying of the data to the destination MLC block 150 to end or be aborted prematurely before all of the data is copied. Another example error event may include a program failure, where even though all of the data may be copied to the destination MLC block 150, some of the data may be incorrectly programmed into the destination MLC block 150. Other error events or combinations of error events resulting in only some of the data being correctly written to the destination MLC block 150 may be possible.

When an error event occurs during a folding operation, one option may be to discard the entire destination MLC block 150 and restart the folding operation using a new destination MLC block 150. Under this option, partial use of MLC blocks is avoided. As a result, even though some of the data may be correctly copied to the initial destination MLC block 150 during the folding operation despite the error event, that data is discarded along with the destination MLC block 150 due to the error event.

Rather than discard the destination MLC block 150 entirely when an error event occurs, another option may be to keep the destination MLC block 150 and at least some of the portions of the data that were correctly copied to the destination MLC block. To do so, a system may be employed that tracks groups of pages of data selected for folding, and determines whether to commit pages that are copied to the destination MLC block based on the groups or on a group-by-group basis.

Referring back to FIG. 2, assuming that the circuit schematic is representative of a portion of a source SLC block 148, each of the pages and associated wordlines of the source SLC block 148 may be grouped into one of a plurality of sets, denoted as SET 1 to SET 6 in FIG. 2. For some example configurations, the sets may each have the same size of data or the same number of N pages and/or wordlines. Further, the pages and/or wordlines in the sets may be continuous or consecutive. For the example configuration shown in FIG. 2, each set may include eight pages or wordlines (i.e., N=8). Further, consecutive sets may include consecutive or continue pages and/or wordlines. Accordingly a first set ($SET_1$) includes page 0 to page 7 (WL0 to WL7), a second set ($SET_2$) includes page 8 to page 15 (WL8 to WL15), a third set ($SET_3$) includes page 15 to page 23 (WL16 to WL23), a fourth set ($SET_4$) includes page 24 to page 31 (WL24 to WL31), a fifth set ($SET_5$) includes page 32 to page 39 (WL32 to WL39), and a sixth set ($SET_6$) includes page 40 to page 47 (WL40 to WL47). For other example configurations, the numbers of pages and/or wordlines in the sets may be different from each other and/or the pages or wordlines in the sets may not be continuous.

Figure 3:
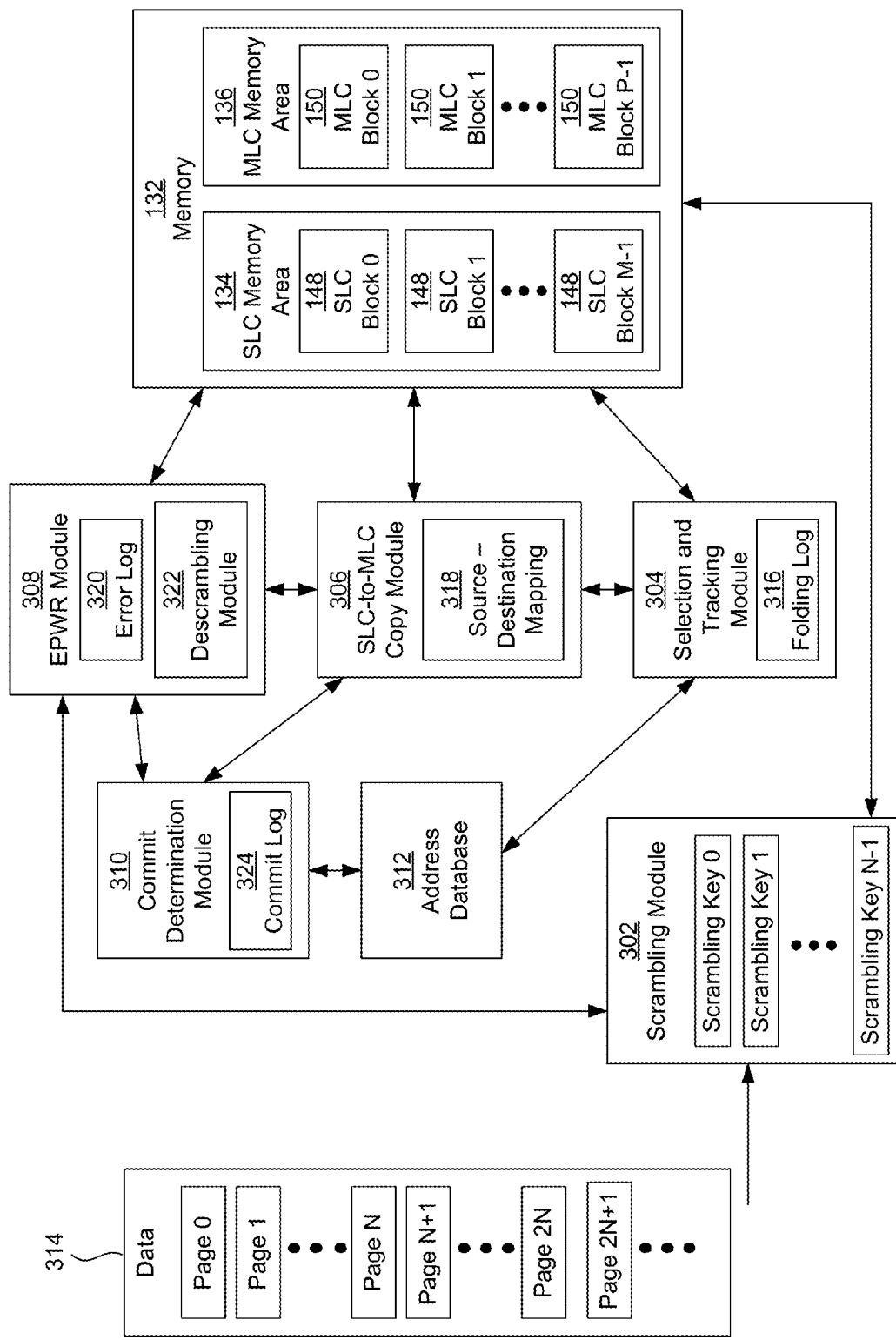
FIG. 3 is a block diagram of a plurality of modules associated with a folding operation performed by a storage module of the storage system of FIG. 1.

FIG. 3 shows a block diagram of a plurality of modules associated with performance of a folding operation. The plurality of modules may include a scrambling module 302, a selection and tracking module 304, an SLC-to-MLC copy module 306, an EPWR module 308, and a commit determination module 310.

Before data is programmed to an SLC block 148 of the SLC memory area 134 (FIG. 1), the data may be processed by the scrambling module 302, which may scramble or randomize the data. Scrambling the data prior to writing it into memory may decrease the memory's sensitivity to patterns, which in turn may enhance the memory's ability to store and/or retain the data correctly. The following describes a scrambling scheme that depends on the physical distribution of the data rather than on a logical group size of the data, while maintaining a minimum distance between repetition of scrambling keys, whether the scrambling is for data to be stored in a SLC block 148 or a MLC block 150.

FIG. 3 shows a plurality of pages of data 314 being sent to the scrambling module 302 before being written to one or more SLC blocks 148. To scramble the data 314, the scrambling module 302 may use a plurality of different scrambling keys. These scrambling keys may then be used to properly descramble and/or decode the data after the data is read from the memory 132. In particular, the same scrambling key used to scramble data may also be used to descramble the data so that the data is descrambled correctly. In addition, different scrambling keys may provide different, or at least sufficiently different, sequencing of ones and zeros for different sets of data.

As shown in FIG. 3, the scrambling module 302 may use an N-number of scrambling keys, including Scrambling Key 0, Scrambling Key 1, . . . , Scrambling Key (N−1). The N-number of scrambling keys may correspond to and/or be the same as the N-number of pages and/or wordlines in a set. To illustrate, referring to back to FIG. 2, the forty-eight wordlines and/or pages were grouped into six sets of eight. Accordingly, the scrambling module 302 may use eight different scrambling keys to scramble the six sets. In addition, each of the scrambling keys may be used to scramble one of the pages of data in a set. Further, the scrambling key that is used may correspond to the position of the page in the set. Otherwise stated, the ith scrambling key may be used to scramble the ith page in the set. Accordingly, for an N-number of scrambling keys and pages of data in a set, the scrambling module 302 may use the first Scrambling Key 0 to scramble the first page in the sets (e.g., Page 0, Page N, Page 2N, . . . ), the second Scrambling Key 1 to scramble the second page in the sets (Page 1, Page N+1, Page 2N+1, . . . ), the Nth Scrambling Key N−1 to scramble the Nth page in the sets (Page N−1, Page 2N−1, . . . ), and so on.

By using the same scrambling key every Nth page and/or by using different scrambling keys for each of the pages in a set, the randomized sequencing of ones and zeros may be sufficiently different for neighboring pages, which may further enhance the memory's ability to store and/or retain the data correctly. Along these lines, where an end or final destination of the data is a destination MLC block 150, the N may be chosen to be a number other than a multiple of the number of bits the memory cells in the MLC block 150 are configured to store. For example, where the memory cells in the MLC block 150 store three bits of data, N may be chosen to be a number other than a multiple of three so that the sequencing of ones and zeros do not repeat in the MLC blocks within an acceptable margin.

Figure 7:
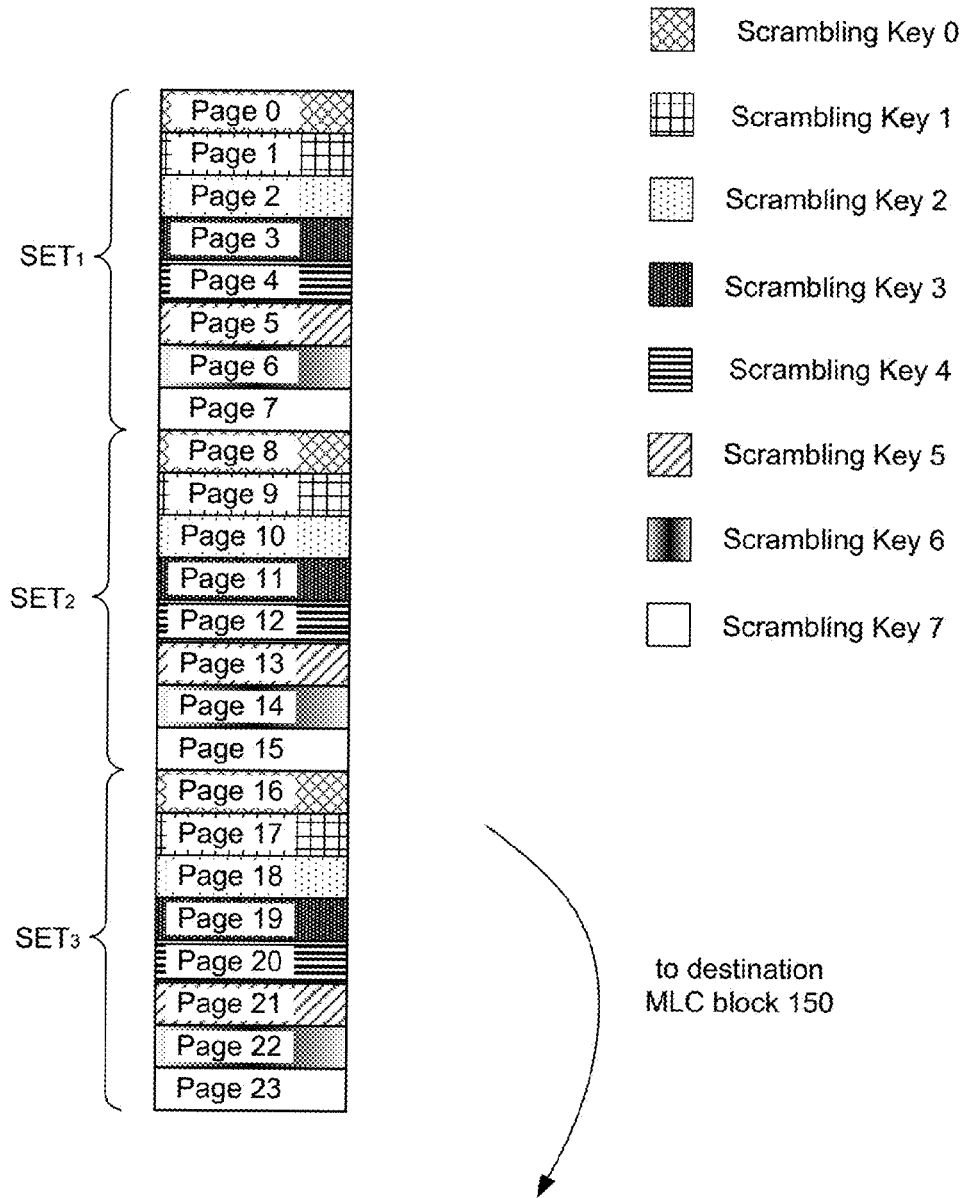
FIG. 7 shows a schematic diagram of an example scrambling scheme.

FIG. 7 shows a schematic diagram of an example implementation of the above-described scrambling scheme, where eight pages in each of three sets $SET_1$, $SET_2$, $SET_3$ are scrambled using eight scrambling keys, and the scrambled pages are sent to a destination MLC block 150 that stores three pages per wordline (i.e., each wordline is coupled to MLCs that store three pages of data). As shown in FIG. 7, in the destination MLC block 150, a first wordline $WL_0$ is coupled to memory cells storing pages 0-2, the second wordline $WL_1$ is coupled to memory cells storing pages 3-5, the third wordline $WL_2$ is coupled to memory cells storing the pages 6-8, and so on. By setting each of the number of pages in a set and the number of scrambling keys used to scramble the data at eight and maintaining the order in which the scrambling keys are used for each of the sets, no two wordlines of the eight wordlines $WL_0$ to $WL_7$ shown in FIG. 7 store pages of data that were scrambled using the same three scrambling keys.

For other example scrambling schemes, the number of scrambling keys may be different than the number of pages in a set. For example, the number of scrambling keys may be less than the number of pages in a set such that at least one of the scrambling keys may be used two or more times to scramble two or more pages in a set. However, even for example schemes where the numbers are different, the order in which the scrambling keys are used from set to set may be the same.

In general, the scrambling module 302 may be configured to scramble the plurality of sets in accordance with a scrambling scheme that identifies a number of scrambling keys to use to scramble the plurality of sets, and a pattern in which to use the scrambling keys to scramble the pages in a set. The scrambling module 302 may be configured to repeat the pattern for each of the sets.

After the scrambling module 302 scrambles each of the pages of the data 314 with the N-number of scrambling keys, the scrambled pages may then be stored in one or more SLC blocks 148. At some time after the scrambled pages are stored in the one or more SLC blocks 148, the controller 110 may determine perform a folding operation on the one or more SLC blocks 148—that is to move the data 314 stored in the one or more SLC blocks 148 to one or more destination MLC blocks 150. For each of the one or more SLC blocks 148, the selection and tracking module 304 may be configured to identify the different sets of pages and/or wordlines and select which of the different sets to fold. To do so, the selection and tracking module 304 may be configured to determine whether each set is valid or invalid. A set is valid if all of the data in that set is valid. A set is invalid if at least some of the data in that set is invalid (otherwise referred to as obsolete). In further detail, data is valid if it is the most recent version or copy of the data (i.e., there is not a more recent version or copy located somewhere else in the memory 132). On the other hand, if the data is invalid or not the most recent version or copy, then that data may be referred to as invalid or obsolete. If at least one data fragment or segment of a page in a set is invalid or obsolete, then the selection and tracking module 304 may identify the set as invalid. On the other hand, if the selection and tracking module 304 does not identify any pages or any data fragments or segments in the pages as invalid (i.e., all of the pages and/or all of the data fragments or segments in the pages of a set are valid), then the selection and tracking module 302 may identify the set as valid.

In order to determine whether the data is valid or invalid, the selection and tracking module 304 may be configured to access an address database 312, which may be stored in the memory 132, the controller memory 118, or external to the storage module 102, or combinations thereof. The address database 312 may identify where the most recent version of the data is located in the memory 132. Various configurations of the address database 312 may be possible. For example, the address database 310 may include a single table (or other type of address data structure), or a plurality of tables, such as a main table and a one or more secondary tables that track where fragments of data are stored, where updates or changes to locations of the pages, or combinations thereof. In addition, the address database 312 may provide mappings of logical address information and physical address information. Logical addresses may be associated with an addressing scheme maintained and/or managed by the host system 101 (FIG. 1). Physical addresses may identify the physical location in the memory 132 where the data is stored.

Each page of data and/or each data segment or fragment may have associated logical address information, which may include a logical group number and an offset. When the selection and tracking module 304 analyzes the pages of data in a set, the selection and tracking module 304 may identify the logical address for the page of data and the physical address at which the page of data is stored in the SLC block 148. The selection and tracking module 304 may then use that logical and physical address information when accessing the address database 312 to determine whether a page is valid or invalid.

If the selection and tracking module 304 identifies a set as valid, then the selection and tracking module 302 may select that set as ready or eligible for folding. If a set is invalid, then the selection and tracking module 302 may not select or deem as ineligible that set for folding. The selection and tracking module may maintain and/or manage a folding log 316 (such as a bitmap) that includes folding information identifying whether each set in a SLC block 148 is ready or eligible for folding.

After the selection and tracking module 304 identifies each of the sets as either valid or invalid and creates the folding log 316, the selection and tracking module 304 may send the folding log 316 to the SLC-to-MLC copy module 306. In response, the SLC-to-MLC copy module 306 may copy to the one or more destination MLC blocks 150 those sets of pages identified in the folding log 316 as valid, while not copying to the one or more MLC blocks 150 those sets of pages identified in the folding log as invalid. For some example configurations, the SLC-to-MLC cop module 306 may sense the valid sets of pages into latches of the sense circuitry 144, and then copy the sensed valid sets into the one or more destination MLC blocks 150.

For some example configurations, the SLC-to-MLC copy module 306 may be configured to copy the selected sets to the one or more MLC destination blocks 150 in a sequential order in which they are selected. In addition or alternatively, the SLC-to-MLC copy module 306 may be configured to copy the selected sets such that there are no gaps in between the sets.

As an illustration, with reference to the first three sets $SET_1$, $SET_2$, and $SET_3$ identified in FIG. 2, suppose that the selection and tracking module 304 identifies all of the pages of data (pages 0-23) of the first three sets $SET_1$, $SET_2$, $SET_3$ as valid. Further, suppose that the memory cells of the destination MLC block 150 store three pages of data per wordline. Accordingly, the first three pages (pages 0-2) of the first set $SET_1$ may be copied to the memory cells coupled to the first wordline $WL_0$ of the destination MLC block 150; the second three pages (pages 3-5) of the first set $SET_1$ may be copied to the memory cells coupled to the second wordline $WL_1$; the last two pages of data (pages 6-7) and the first page of data (page 8) of the second set $SET_2$ may be copied to the memory cells coupled to the third wordline $WL_2$; the second, third and fourth pages (pages 9-11) of the second set $SET_2$ may be copied to the memory cells coupled to the fourth wordline $WL_3$; the fifth, sixth and seventh pages (pages 12-14) of the second set $SET_2$ may be copied to the memory cells coupled to the fifth wordline $WL_4$; the last page (page 15) of the second set $SET_2$ and the first two pages (pages 16 and 17) of the third set $SET_3$ may be copied to the memory cells coupled to the sixth wordline $WL_5$; the third, fourth, and fifth pages (pages 18-20) of the third set $SET_3$ may be copied to the memory cells coupled to the seventh wordline $WL_6$; and the last three pages (pages 21-23) of the third set $SET_3$ may be copied to the memory cells coupled to the eighth wordline $WL_R$.

As another illustration, suppose that the selection and tracking module 304 identifies the first set $SET_1$ and the third set $SET_3$ as valid, but identifies the second set $SET_2$ as invalid. Accordingly, the first three pages (pages 0-2) of the first set $SET_1$ may be copied to the memory cells coupled to the first wordline $WL_0$; the second three pages (pages 3-5) of the first set $SET_1$ may be copied to the memory cells coupled to the second wordline $WL_1$; the last two pages of data (pages 6-7) and the first page (page 16) of the third set $SET_3$ may be copied to the memory cells coupled to the third wordline $WL_2$; the second, third and fourth pages (pages 17-19) of the third set $SET_3$ may be copied to the memory cells coupled to the fourth wordline $WL_3$; the fifth, sixth and seventh pages (pages 20-22) of the third set $SET_3$ may be copied to the memory cells coupled to the fifth wordline $WL_4$; the last page (page 23) of the third set $SET_3$ may be copied to the memory cells coupled to the sixth wordline $WL_6$.

In addition to copying the valid sets of pages to the one or more destination MLC blocks 150, the SLC-to-MLC copy module 306 may also maintain a source-destination mapping 318 that may associate the valid pages that are being folded and the physical locations or addresses of the one or more destination MLC blocks 150 to which the valid pages are being copied. As described in further detail below, other modules may use this mapping information upon deciding to update the address database 310.

After the valid sets are copied (folded) to the one or more destination MLC blocks 150, the EPWR module 308 may perform an enhanced post-write-read error analysis or other verification analysis on the copied valid sets in the destination MLC block 150 to verify that the data is written correctly. For some example configurations, the EPWR module 308 may be part of and/or implemented by the ECC module 122 (FIG. 1), and so the copied sets of data may be sent from the destination MLC block 150 to the storage module controller 110 for verification. For other example configurations, the EPWR module 308 may be part of the memory controller 142, and so the data is not sent to the storage module controller 110 for verification.

For some example configurations, the post-write-read error analysis may include determining whether a page of the copied data has a bit error rate (BER) that is below an uncorrectable threshold level. If it is, then the EPWR module 308 and/or the ECC module 122 may be able to correct any errors (e.g., change any bits to their proper values) and the EPWR module 308 may identify the programming of that page as successful. Alternatively, if the BER of the page is above the uncorrectable threshold level, then the EPWR module 308 and/or the ECC module 122 may be unable to correct all of the errors (e.g., change all of the bits to their proper values), and the EPWR module 308 may identify the programming of that page as a failure. In addition, the EPWR module 308 may maintain an error log 320 that identifies for each page whether the programming was successful or a failure.

For some example configurations, in order for the EPWR module 308 to determine whether or not the pages were programmed successfully, the pages may need to be descrambled. To descramble the pages, the EPWR module 308 may include a descrambling module 322 to descramble the data. (For other example configurations, the descrambling module 322 may be considered a separate component from the EPWE module 308). The descrambling module 322 may access from the scrambling module 302 and use the N-number of scrambling keys to descramble the pages. In addition, for each of the pages, the descrambling module 322 may use the same scrambling key to descramble the page that the scrambling module 302 used to scramble the page in order for the descrambling to be performed correctly.

Because the scrambling module 302 used the N-number scrambling keys to scramble the N-number of pages in the same order for each of the sets, the sets of valid pages that are copied to the destination MLC blocks 150 may be successfully descrambled using the correct scrambling keys regardless of whether all of the sets are folded or only some of the sets are folded. For example, using the illustrations above with the three sets SET$_1$, SET$_2$, and SET$_3$, the descrambling module 322 may use the first Scrambling Key 0 to descramble the first page for each of the sets, the second Scrambling Key 1 to descramble the second page for each of the sets, and so on, regardless of whether all three of the sets SET$_1$, SET$_2$, SET$_3$ are copied to the destination MLC block 150 or only the first and third sets SET$_1$ and SET$_3$ are copied to the destination MLC block 150.

After the EPWR module 308 finishes determining whether programming the pages was successful or not, the EPWR module 308 may send the error log 320 to the commit determination module 310. Using the error log 320, the commit determination module 310 may be configured to determine whether to commit or ignore committing each of the pages that were copied to the MLC block. A page may be "committed" when its associated entry in the address database 312 is updated to identify the physical address in the destination MLC block 150 storing the page rather than the physical address in the source SLC block 148 storing the page as the physical address where the most recent or valid version of the page is being stored. Accordingly, after committing a page, whenever the controller 110 wants to read that page, access of the address database 312 will identify the physical address in the destination MLC block 150 rather than the physical location in the source SLC block 148 as the valid physical location. Conversely, when the commit determination module 310 "ignores committing" a page, no update of the address database 312 may occur. As a result, the address database 312 may continue to identify the physical address in the SLC block 148 rather than the physical address in the MLC block 150 as the valid physical address for the page.

If the error log 320 identifies a page as being successfully programmed, then the commit determination module 310 may identify that page as being eligible for being committed. Alternatively, if the error log 320 identifies a page as being unsuccessfully programmed (i.e. a program failure occurred for that page), then the commit determination module 320 may determine not to commit or ignore committing that page.

In addition, the commit determination module 310 may be configured to commit and ignore pages on a set-by-set basis. Accordingly, if a program failure occurred for at least one page in a set, then the commit determination module 310 may determine to ignore all of the pages in that set. On the other hand, if the error log 320 identifies that all of the pages in a set are programmed successfully, then the commit determination module 310 may determine either to commit the set of pages or to determine that the set of pages are only eligible for being committed.

In further detail, for some example configurations, the commit determination module 310 may determine whether to commit or ignore sets of pages based on the information in the error log 320 alone. For other example configurations, the commit determination module 310 may determine whether to commit or ignore sets of pages based on the error log 320 and a margin analysis. In the event of a program failure for a page, a certain predetermined number of neighboring pages may experience similar program failures in the near future. For example, the reason a program failure may occur for a page (e.g., endurance, read disturb, structural defect, etc.) may similarly cause a read error event to occur for neighboring pages. As such, even if those neighboring pages were identified as being programmed successfully, it may be advantageous not to commit (i.e., ignore) those neighboring pages in order to avoid future read error events when reading those neighboring pages.

Figure 4:
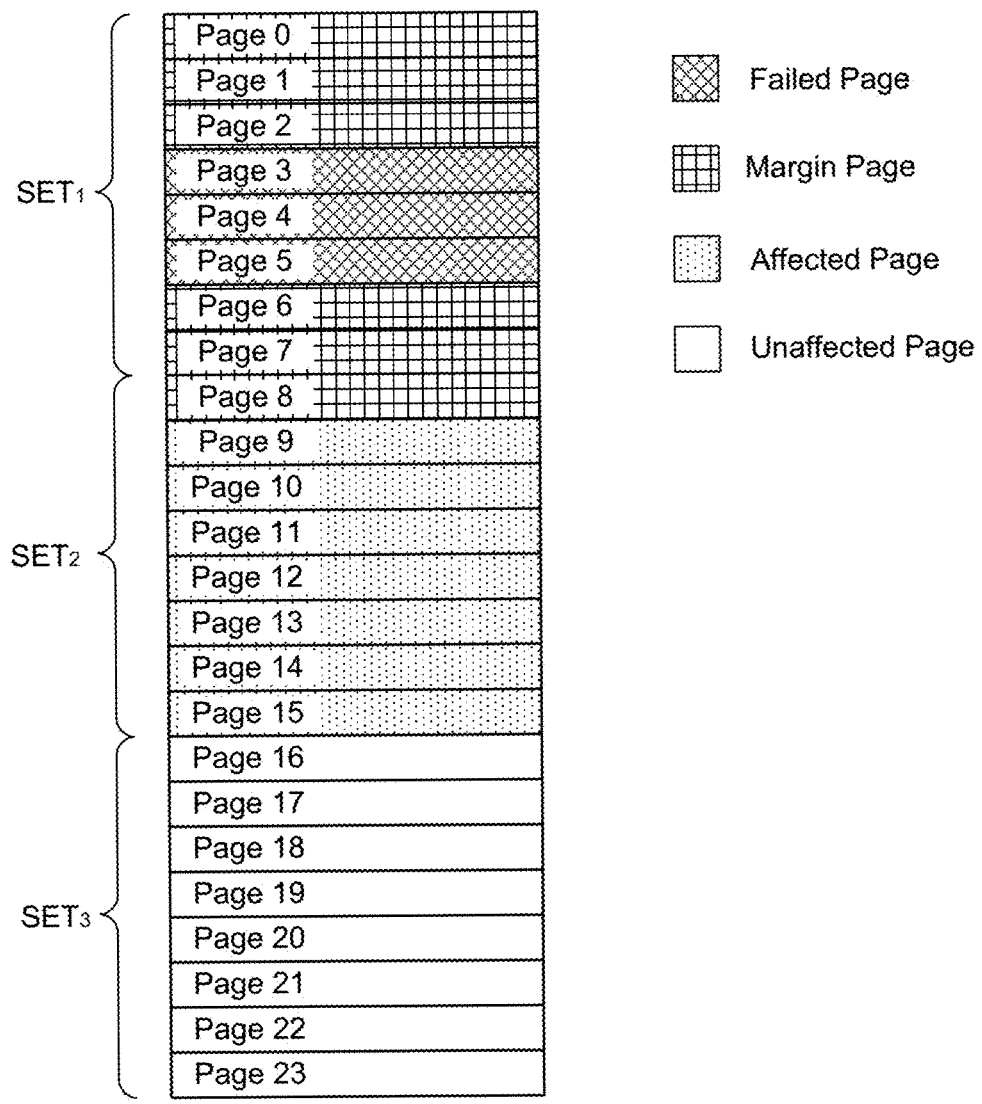
FIG. 4 is schematic diagram of an example margin analysis.

FIG. 4 shows a schematic diagram of three sets SET$_1$, SET$_2$, SET$_3$ of eight pages (page 0 to page 23), illustrating an example margin analysis performed by the commit determination module 310. Suppose that when the SLC-to-MLC copy module 306 programs the three sets of eight pages into a destination MLC block 150, the EPWR module 308 subsequently determines a program failure for pages 3, 4, 5. Upon determination of the program failures, the commit determination module 310 may identify one or more margin page. A page may be identified as a margin page if the page is within a predetermined number of pages away from a failed page, or the outer bounds of a range of failed pages. In the example margin analysis shown in FIG. 4, the predetermined number may be three. Further, since the program failure occurred for a range of pages (i.e., pages 3-5), then the margin pages may be those pages that are within three pages away from page 3 and within three pages away from page 5. In this case, pages 0-2 and pages 6-8 are within three pages away from pages 3 and 5, respectively, and so are identified as margin pages.

Under the margin analysis, the commit determination module 310 may determine to ignore margin pages. Further, since the commit determination module 310 commits and ignores pages on a set-by-set basis, then the commit determination module 310 may determine to ignore committing a set of pages if at least one page in a set is identified as a margin page, even if there are no failed pages in that set. For example, as shown in FIG. 4, because page 8 is part of the second set SET$_2$, all of the pages in the second set SET$_2$ may be ignored. Accordingly, pages 9-15 of the second set SET$_2$ may be identified as affected pages.

As such, under the margin analysis, the commit determination module 310 may determine to ignore committing a set if that set has at least one failed page or at least one margin page. In the example margin analysis shown in FIG. 4, the third set SET₃ of pages does not have either a failed page or a margin page, and so the commit determination module 310 may determine to commit the third set SET₃ of pages (pages 16-23).

Referring back to FIG. 3, upon completing the margin analysis, the commit determination module 310 may update the error log 320 and/or create a commit log 324 that identifies which of the sets to commit and which to ignore. In addition, the commit determination module 310 may access the address database 312 and commit the selected sets by updating the corresponding entries in the address database 312 to identify that the valid physical location for those selected sets of pages is their associated physical addresses in the destination MLC block. Also, for some example configurations, in order to update the address database 312, the commit determination module 310 may be configured to access the source-destination mapping 318 to identify the physical addresses of the committed pages in the destination MLC block 150.

As previously described, the selection and tracking module 304 may identify a set of pages as invalid when at least one of the pages has invalid or obsolete data. For some example configurations, pages or sets of pages identified as invalid may be scheduled for a compaction process in which valid data in the invalid sets is separated from the invalid data and compacted together. By determining whether to commit or not commit pages of data on a set-by-set basis, a similar compaction process due to program failures may be avoided. Conversely, if pages were committed on a page-by-page basis, in the event of a program failure, some pages in a set would be committed while others would be ignored. Such a page-by-page commitment scheme would cause corresponding sets remaining in the source SLC block 248 to have obsolete data, which in turn would render that set eligible for compaction.

In addition, by configuring the commit determination module 310 to commit and ignore pages of data on a set-by-set basis, a destination MLC block 150 may not be entirely discarded should an error event occur during a folding operation that results in only some of the data being successfully written to the destination MLC block 150. Instead, those sets of data that were successfully written may be committed, resulting in the destination MLC block 150 as being recognized as storing at least some valid data. Further, should an error event causing the storage module 102 to shut down during a folding operation occur, the storage module 102 may be configured to retain the folding log 316, the source-destination mapping 328, the error log 320, and/or the commit log 324 to resume any remaining portions of the folding operation and/or to commit any sets of data that should be committed but were not due to the shutdown once the storage cycle starts back up and resumes operation. In addition or alternatively, if an error event causing the storage module 102 to shut down during a folding operation occurs, the commit determination module 310 may be configured to analyze the error log 320 and/or the commit log 324 and update the address database 312 to commit any sets of data prior to shutting down.

Further, while the above functions and operations are described in the context of a folding operation where data may be moved from one or more source SLC blocks 148 to one or more destination MLC blocks 150, similar operations may be performed for moving data between blocks of the same bit-per-cell density (such as from one or more source SLC blocks to one or more destination SLC blocks or from one or more source MLC blocks to one or more destination MLC blocks), or between blocks having different multi-bit per cell densities, such as from one or more source MLC blocks having a two bits per cell density to one or more destination MLC blocks having a three bits per cell density.

Additionally, the plurality of modules shown in and described with reference to FIG. 3, including the scrambling module 302, the selection and tracking module 304, the SLC-to-MLC copy module 306, the EPWR module 308, the commit determination module 310, and the descrambling module 322 may be implemented in the storage module controller 110, the memory controller 142, or a combination thereof. In addition, each of the modules may be implemented in hardware or a combination of hardware and software. For example, each module may include an integrated circuit such as an application specific integrated circuit (ASIC) or a field programmable gate array (FPGA), a circuit, a digital logic circuit, an analog circuit, a combination of discrete circuits, gates, or any other type of hardware or combination thereof. In addition or alternatively, each module may include memory hardware, such as a portion of the controller memory 118 or the memory 132, for example, that comprises instructions executable with the processor 112, a processor of the memory controller 142, or other processor, to implement one or more of the features of the module. When any one of the module includes the portion of the memory that comprises instructions executable with a processor, the module may or may not include the processor. In some examples, each module may just be the portion of the controller memory 118, the memory 132, or other physical memory that comprises instructions executable with a processor to implement the features of the corresponding module without the module including any other hardware. Because each module includes at least some hardware even when the included hardware comprises software, each module may be interchangeably referred to as a hardware module.

Figure 5A:
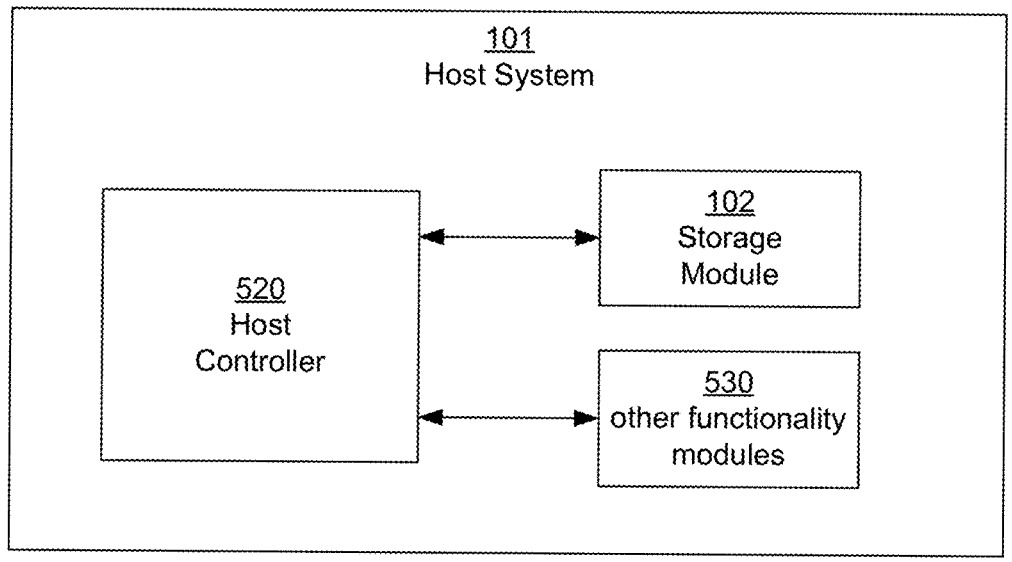
FIG. 5A is a block diagram of the storage module shown in FIG. 1 embedded in a host.
Figure 5B:
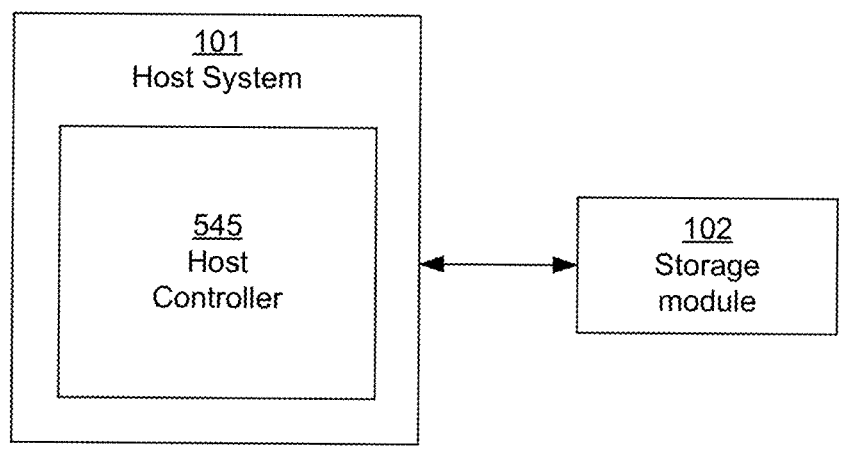
FIG. 5B is a block diagram of the storage module shown in FIG. 1 removably connected with a host.

Referring to FIGS. 5A and 5B, for some example configurations, the storage module 102 may be implemented with the host system 101 by being an embedded device of the host system 101 or by being removably connected with the host system 101. FIGS. 5A and 5B show these implementations. As shown in FIG. 5A, the storage module 102 may be embedded in the host system 101. In addition to embedding the storage module 102, the host system 101 may have a host controller 520. That is, the host system 101 may embody the host controller 520 and the storage module 102, such that the host controller 520 interfaces with the embedded storage module 102 to manage its operations. For example, the storage module 102 can take the form of an iNAND™ eSD/eMMC embedded flash drive by SanDisk Corporation. The host controller 520 may interface with the embedded storage module 102 using the host interface 116 (FIG. 1). Additionally, when the storage module 102 is embedded in the host system 101, some or all of the functions performed by the storage module controller 110 in the storage module 102 may instead be performed by the host controller 520.

The host system 510 can take any form, such as, but not limited to, a solid state drive (SSD), a hybrid storage module (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader, as examples. As shown in FIG. 5A, the host system 101 can include optional other functionality modules 530. For example, if the host system 101 is a mobile phone, the other functionality modules 530 can include hardware and/or software components to make and place telephone calls. As another example, if the host system 101 has network connectivity capabilities, the other functionality modules 530 can include a network interface. These are just some examples, and other implementations can be used. Also, the host system 101 can include other components (e.g., an audio output, input-output ports, etc.) that are not shown in FIG. 5A to simplify the drawing.

In an alternative configuration shown in FIG. 5B, instead of being an embedded device in a host system, the storage module 102 may have physical and electrical connectors that allow the storage module 102 to be removably connected to the host system 101 (having a host controller 545) via mating connectors. As such, the storage module 102 may be a separate device from (and is not embedded in) the host system 101. In this example, the storage module 102 can be a removable memory device, such as a Secure Digital (SD) memory card, a microSD memory card, a Compact Flash (CF) memory card, or a universal serial bus (USB) device (with a USB interface to the host), and the host system 102 is a separate device, such as a mobile phone, a tablet computer, a digital media player, a game device, a personal digital assistant (PDA), a mobile (e.g., notebook, laptop) personal computer (PC), or a book reader, for example.

Additionally, referring to FIG. 1, the memory 132 may be a semiconductor memory device that includes volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Figure 6:
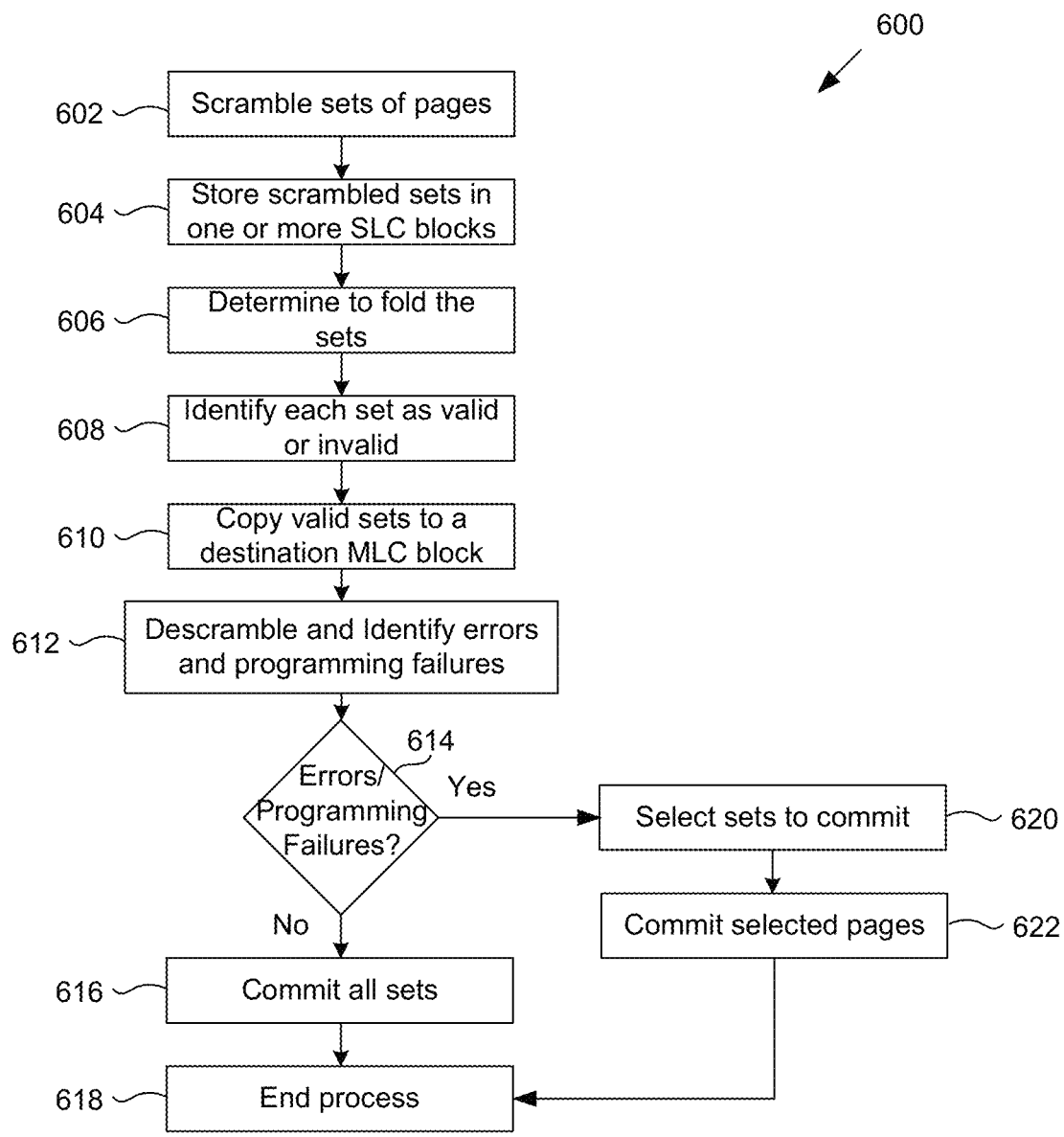
FIG. 6 is a flow chart of an example method of moving data from an initial storage location to a destination multi-level cell (MLC) storage location.

FIG. 6 shows an example method 600 of a storage module moving data from an initial storage location to a destination MLC block of memory via one or more SLC blocks of the memory in the storage module. The initial storage location of the data may be a RAM portion of a controller of the storage module, although other storage locations, such as another SLC block or a storage location external the storage module may be possible. In addition, the data may be organized by the storage module into a plurality of sets of an N-number of pages.

At block 602, a scrambling module of the storage module may scramble the sets of pages. The scrambling module may use an N-number of scrambling keys to scramble the data. In particular, the scrambling module may use a different one of the N-number scrambling keys to scramble each of the N-pages in a set. The order in which the scrambling module uses the N-number of scrambling keys may be the same for each of the plurality of sets that are scrambled.

At block 604, the scrambled sets of data may be stored in the one or more SLC blocks. At block 606, the storage module may determine to fold the sets of data stored in the one or more SLC blocks into a destination MLC block, such as by copying valid data stored in the one or more SLC blocks into the destination MLC block and then committing at least some of valid data.

At block 608, a selection and tracking module may identify each set stored in the one or more SLC blocks as either valid or invalid, and select the valid sets as eligible or ready for folding. As previously described, the selection and tracking module may maintain a folding log that identifies each of the sets as either eligible or ineligible for folding.

At block 610, using the folding log, a SLC-to-MLC copy module may copy the valid sets of pages to the destination MLC block. The SLC-to-MLC may also maintain a source-destination mapping that identifies the physical address or location in the destination MLC block to which the pages in the valid sets are being copied.

At block 612, an EPWR may perform a post-write-read error analysis on the copied valid sets in the destination MLC block to identify any programming errors and/or verify whether the pages were successfully programmed in the destination MLC block. In addition, the EPWR module may maintain an error log that identifies any program failures associated with the programming of the sets into the destination MLC block. In addition, for some example methods, at block 612, prior to performing the post-write-read error analysis, the pages in the sets that were copied into the destination MLC block may be descrambled using the N-number of scrambling keys.

At block 614, a commit determination module may analyze the error log and if no program failures are identified, then at block 616, all of the sets of pages that were copied to the destination MLC block may be committed. At block 618, the process of moving the data to the destination MLC block may end.

Alternatively, at block 614, if a program failure is identified, then at block 620, the commit determination module may select which of the sets to be committed on a set-by-set basis. In particular, the commit determination module may select as eligible for commitment those sets that do not have any pages that were unsuccessfully programmed. In addition, for some example methods, the commit determination module may perform a margin analysis to identify margin pages that are within a predetermined number away from failed pages. After identifying the margin pages, the commit determination module may select for commitment on a set-by-set basis those sets that do not have either a failed page or a margin page.

At block 622, the commit determination module may commit the sets it selected for commitment at block 620 and not commit (i.e., ignore) the other sets. As previously described, the commit determination module may commit the selected sets by updating an address database that identifies physical address and/or logical-to-physical address mappings for the valid versions of the data. Conversely, when the commit determination module determines not to commit a set, the commit determination module may not update the address database for the pages in that set. After committing the selected sets, the method may proceed to block 618, where the process ends.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

We claim:
1. A device comprising:
at least one memory; and
control circuitry in communication with the at least one memory, the control circuitry configured to move data stored in a first non-volatile memory block of the at least one memory to a second non-volatile memory block of the at least one memory, wherein the second non-volatile memory block wherein the data is organized into a plurality of sets, wherein each set of the plurality of sets comprises more than a single page of data and less than an entire block of data, and wherein the control circuitry, in response to a determination to move the data from the first non-volatile memory block to the second non-volatile memory block, is configured to:
identify each of the plurality of sets as valid or invalid;
store a copy of a set of the plurality of sets in the second non-volatile memory block in response to the set identified as valid; and
update an address data structure to identify that a valid version of the set is located at a physical address in the second non-volatile memory block where the copied set is stored in response to the copied set passing a post-write-read error analysis.

2. The device of claim 1, wherein each set of the plurality of sets comprises a same size of data.

3. The device of claim 1, wherein each set of the plurality of sets comprises a same number of pages of data.

4. The device of claim 1, wherein the first non-volatile memory block has a lower bit-per-cell density than the second non-volatile memory block.

5. The device of claim 4, where the first non-volatile memory block and the second non-volatile memory block each comprise flash memory, and wherein the first non-volatile memory block comprises single-level cell (SLC) memory elements, and wherein the second non-volatile memory block comprises multi-level cell (MLC) memory elements.

6. The device of claim 1, wherein the physical address comprises a first physical address, and wherein the address data structure identifies that the valid version of the set is located at a second physical address in the first non-volatile memory block in response to the copied set failing the post-write-read error analysis.

7. The device of claim 1, wherein control circuitry is configured to identify the set as valid in response to the address data structure identifying that no portion of data in the set is obsolete.

8. The device of claim 1, wherein the control circuitry is further configured to determine not to store the copy of the set to the second non-volatile memory block in response to the set identified as invalid.

9. The device of claim 1, wherein the post-write-read error analysis comprises a determination of whether the set has a bit error rate that exceeds a threshold level.

10. The device of claim 1, wherein the control circuitry is configured to update the address data structure to identify that the valid version of the set is located at the physical address further in response to the set passing a margin analysis.

11. The device of claim 10, wherein the set passes the margin analysis when no page in the set is within a predetermined number of pages away from a page that failed the post-write-read analysis.

12. The device of claim 1, wherein the at least one memory comprises three-dimensional memory.

13. The device of claim 1, wherein the control circuitry is on the same substrate as memory elements of the at least one memory.

14. A device comprising:
control circuitry configured to:
determine to move data stored in a first block of non-volatile memory to a second block of the non-volatile memory;
in response to the determination, store a first copy of a first portion of the data in the second block without storing a second copy of a second portion of the data in the second block; and
update an address data structure to identify that a valid version of the first portion is stored in the second block in response to the first copy passing a post-write-read analysis.

15. The device of claim 14, wherein the data is divided into a plurality of sets, and wherein each set of the plurality of sets comprises a same number of pages.

16. The device of claim 14, wherein the first block has a lower bit-per-cell density than the second block.

17. The device of claim 14, wherein the control circuitry is further configured to:
identify in the address data structure that the valid version of the first portion is stored in the first block in response to the first copy failing the post-write-read error analysis.

18. The device of claim 14, wherein the control circuitry is further configured to:
identify the first portion as valid and the second portion as invalid.

19. The device of claim 14, wherein the post-write-read error analysis comprises a determination of whether the set has a bit error rate that exceeds a threshold level.

20. The device of claim 14, wherein the control circuitry is configured to update the address data structure to identify that a valid version of the first portion is stored in the second block further when the first copy passes a margin analysis.

21. The device of claim 20, wherein the first copy passes the margin analysis when no page in the set is within a predetermined number of pages away from a page that failed the post-write-read analysis.

22. A device comprising:
a non-volatile memory comprising a first non-volatile memory block and a second non-volatile memory block;
means for identifying each of a plurality of sets of data stored in the first non-volatile memory block as valid or invalid, wherein each set of the plurality of sets comprises more than a single page of data and less than an entire block of data;
means for storing a copy of a set of the plurality of sets in the second non-volatile memory block in response to the set being valid; and
means for updating an address database to identify that a valid version of the set is located at a physical address in the second non-volatile memory block where the copied set is stored in response to the copied set passing a post-write-read error analysis.

* * * * *